April 18, 1933.  E. R. HENTSCHEL  1,904,140
FREQUENCY CONTROL APPARATUS
Filed May 23, 1930  2 Sheets-Sheet 1
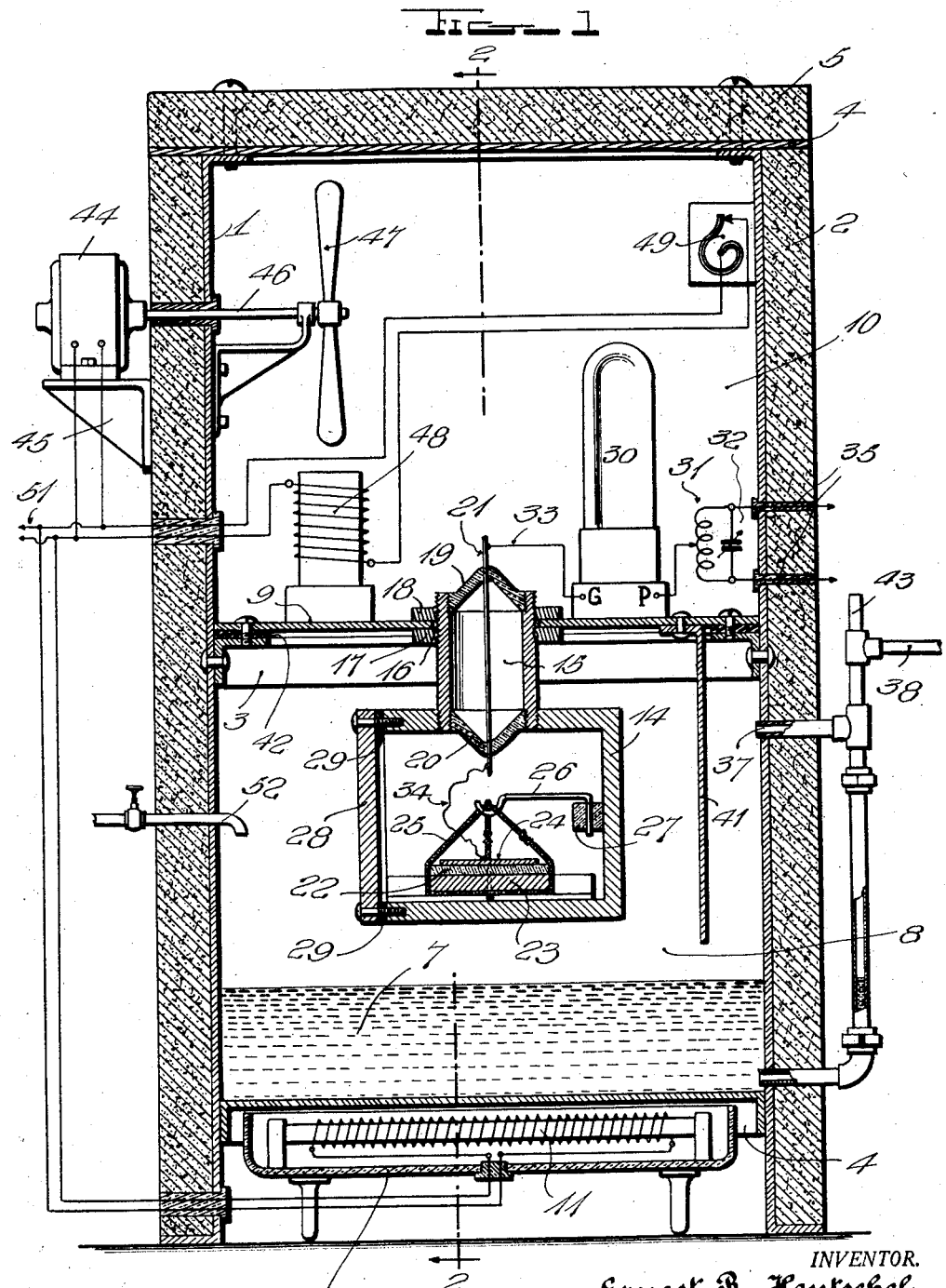
INVENTOR.
Ernest R. Hentschel,
BY Harold Dodd
ATTORNEY.

April 18, 1933.  E. R. HENTSCHEL  1,904,140
FREQUENCY CONTROL APPARATUS
Filed May 23, 1930   2 Sheets-Sheet 2
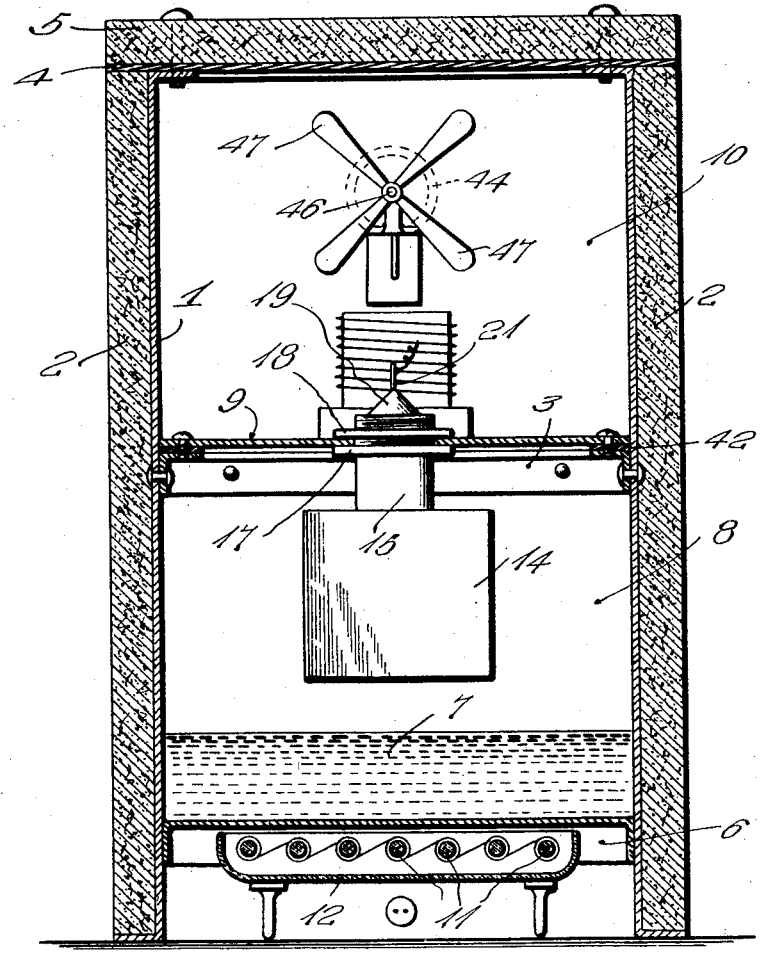
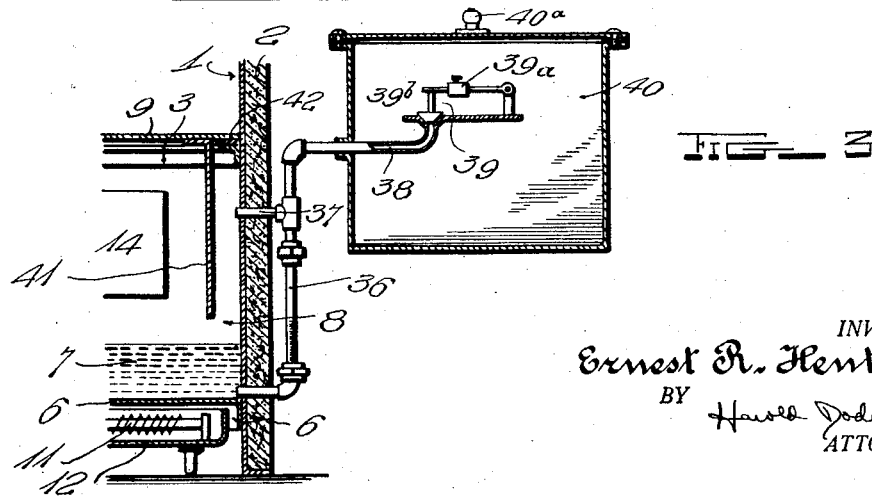
INVENTOR.
Ernest R. Hentschel,
BY Harold Dodd.
ATTORNEY.

Patented Apr. 18, 1933

1,904,140

UNITED STATES PATENT OFFICE

ERNEST R. HENTSCHEL, OF WASHINGTON, DISTRICT OF COLUMBIA; JOHN OLSON, ADMINISTRATOR OF SAID ERNEST R. HENTSCHEL, DECEASED, ASSIGNOR TO WIRED RADIO, INC., OF NEW YORK, N. Y., A CORPORATION OF DELAWARE

FREQUENCY CONTROL APPARATUS

Application filed May 23, 1930. Serial No. 455,130.

My invention relates broadly to frequency control apparatus and more particularly to an apparatus for maintaining constant temperature in the vicinity of frequency determining apparatus.

One of the objects of my invention is to provide a constant frequency control apparatus in which the temperature in the vicinity of a frequency determining element is maintained at a precise value so that the operating conditions under which the frequency determining element functions can be maintained constant at all times.

Another object of my invention is to provide a construction of frequency control apparatus in which the operation of the frequency determining element is maintained constant by utilization of the principle of the latent heat of vaporization of a liquid.

A further object of my invention is to provide a construction of frequency control apparatus wherein a frequency determining element may be operated at constant temperature by maintaining the frequency determining element at constant pressure and utilizing the latent heat of vaporization of a liquid to absorb fluctuations in heat supply for preventing change in temperature in the vicinity of the frequency determining element.

A still further object of my invention is to provide an arrangement of frequency determining element within a chamber whereby the operating temperature of the frequency determining element is fixed by utilizing the latent heat of vaporization of a liquid at constant pressure to continuously supply heat to the frequency determining element and avoiding the intermittent application of heat to the frequency determining element as heretofore practiced in the art.

Other and further objects of my invention reside in the arrangement of frequency determining apparatus within a cabinet structure as set forth more fully in the specification hereinafter following by reference to the accompanying drawings, in which:

Figure 1 is a cross-sectional view through the cabinet apparatus enclosing the frequency determining element and the temperature control means therefor according to my invention; Fig. 2 is a longitudinal cross-sectional view on line 2—2 of Fig. 1; and Fig. 3 is a view illustrating one form of mechanism which I may employ for maintaining constant pressure within the temperature control apparatus independently of changes in atmospheric pressure.

My invention utilizes the principle of latent heat of vaporization of a liquid. The latent heat of vaporization is the quantity of heat in British thermal units required to convert one pound of a liquid into vapor at the same temperature under a constant external pressure. The latent heat depends upon the temperature at which the process takes place. In the apparatus of my invention, I utilize water as the liquid by which the temperature of the frequency determining element may be fixed, although it will be understood that other liquids may be used. Water which is vaporizing at constant pressure remains at an absolutely constant temperature. The temperature of the vapor above the water is at the same temperature as the water, provided the pressure is the same as that on the surface of the water. I therefore arrange the frequency determining element in a hermetically sealed vapor proof and air tight enclosure in a position where the enclosure is subjected to the passage of the vapor which rises from the water within the cabinet structure. The lower portion of the cabinet structure comprises a tank which contains water and beneath the tank there is arranged a hot plate for electrically heating the tank continuously. The cabinet structure is divided by laterally extending partition into two sections, and in the lower section there is suspended the enclosure which contains the frequency determining element, while in the upper section I arrange the parts of the high frequency oscillator circuit which are also maintained at constant temperature. The partition wall which divides the compartment into two sections is provided with steam tight joints so that no vapor can escape into the upper compartment. Provision is made for maintaining constant pressure in the lower compartment and thermostatic means are employed in the compartment containing the oscillator circuits for controlling the temperature therein. The frequency determining element may be a piezo electric crystal, magneto striction device, or other form of constant frequency control element.

My invention provides means for maintaining constant temperature immediately around a frequency control element for the maintenance of constant frequency. Heretofore in frequency control systems it has been proposed to supply heat intermittently to the frequency control device and the thermal capacity alone of the various parts of the apparatus has been relied upon to absorb the heat which means that there must necessarily be a temperature change. In the device of my invention the latent heat of vaporization is used to absorb the fluctuations in heat supply and the temperature is unchanged. If the pressure is kept constant, the temperature at which vaporization occurs will also be constant, and so any body placed in the vapor will also be kept at constant temperature.

Various temperatures can be maintained by using different liquids or solutions, and by subjecting the device to different pressures.

It is known that atmospheric pressure varies enough to cause appreciable changes in the boiling point of a liquid. It is possible to correct this by using an automatic pressure regulating device which is independent of barometric pressure. The boiling points of water (distilled) at various pressures are tabulated below. It can be seen that quite a minute adjustment of pressure must be made to keep the temperature within the limits of a variation of .004 degree centigrade. But, as shown in the table, a change in the fourth significant figure in the pressure causes a change in only the fifth or sixth significant figure in the temperature. Therefore if the pressure is regulated to within .01 mm, the temperature variation will be kept within .0004 degrees.

| Pressure | Boiling point |
|---|---|
| mm. of mercury | Degrees cent. |
| 759.9 | 99.996 |
| 760. | 100.000 |
| 760.1 | 100.004 |
| 760.2 | 100.007 |

By the accurate fixing of frequency according to my invention, transmitters may be operated on closely adjacent frequencies without interference, and furthermore definite and small seperation between the frequencies of transmitters located in the same city or section of the country where barometric pressure will always be equal at all transmitters, may be established and maintained. Where all such transmitters are equipped with the type of apparatus of my invention and all operate at barometric pressure, the change will be the same at all transmitters and the separation will be maintained.

Referring to the drawings in more detail, reference character 1 designates a cabinet structure having a heat insulated covering 2 along the side walls and covered by a top section 5 and a bottom plate 6. The lower end of the cabinet structure is closed by a bottom plate 6 which forms a hot plate for the vaporization of the liquid which is contained within the lower compartment 8 of the cabinet structure. The laterally extending brackets 3 which are located centrally of the cabinet structure provide means for mounting the supporting plate 9 in a position laterally of the cabinet structure which divides the cabinet structure into the two compartments, that is, the upper compartment shown at 10 and the lower compartment illustrated at 8. The hot plate or bottom 6 is maintained at relatively high temperature at all times by means of electric heating elements illustrated at 11 which is mounted with respect to reflector plate 12 in a position to direct heat upwardly against bottom plate 6 so that the liquid 7 continuously boils. In the path of the vapor generated by the boiling fluid 7, I mount the hermetically sealed closure 14 which contains the frequency determining element. I support the hermetically sealed closure 14 in a position substantially suspended from laterally extending partition plate 9. The closure 14 has a screw threaded connection with the lower end of the tubular member 15, the upper end of which extends through an aperture 16 in the plate 9 and is located in position with respect thereto by nuts 17 and 18 which engage the screw threads on the end of pipe 15 and center the pipe 15 with respect to the partition 9. In each end of pipe 15 I provide insulation members 19 and 20 which serve to center the central conducting rod 21 with respect to pipe member 15 which forms one side of the circuit to the frequency determining element. For the purpose of explaining my invention, I have shown a frequency determining element of the piezo electric crystal type, but it will be understood that a magneto striction oscillator or other form of constant frequency device may be positioned within the compartment 14. The piezo electric crystal is illustrated at 22 resting on a lower contact plate 23 and having its upper surface touched by electrode 24. The stack formed by the piezo electric crystal 22 and the contact plates 23 and 24 are centered by means of flexible cords 25 which are stretched taut by spring 26 supported as a cantilever from one of the side walls of the enclosure 14 as represented at 27.

The closure 14 is hermetically sealed at the periphery of the removable side plate 28 by means of gasket 29. The oscillator apparatus is contained within the upper compartment 10 and has been diagrammatically illustrated as including electron tube 30, inductance 31, condenser 32, and connections to the piezo electric crystal element 22 through leads 33, conductor 21, and flexible connector 34. Connections between the oscillator apparatus and other circuits of a radio transmitter are established by leads extending through tubular insulators 35 in the wall of the cabinet structure. It will be understood that great care must be taken in properly insulating the conductors which pass through the walls of the cabinet apparatus inasmuch as the wall 1 forms a ground for one side of the input circuit of the oscillator. That is, the lower face of the piezo electric crystal 22 connects through electrode 23 to closure 14 and through pipe 15 with partition 9 to which one side of the cathode circuit of electron tube 30 is grounded for completing the connections for the oscillator. The lower compartment 8 is provided with a water gauge 36 having a back connection 37 to the compartment 8 and connecting through pipe 38 to the constant pressure valve mechanism 39 disposed in tank 40. Tank 40 is provided with a relief valve 40a, for maintaining the pressure within tank 40 constant irrespective of external or atmospheric pressure. The constant pressure valve 39 has an adjustable weight 39a thereon for controlling the pressure at which valve 39b will be moved from its weight. The pressure relief valve may be directly mounted upon the pipe line 43. Pipe line 43 may be connected with gauge glass 36 and left open to the atmosphere so that the compartment 8 may be subjected to pressure which is equal to the barometric pressure. With the arrangement shown in Fig. 3, constant pressure may be maintained regardless of changes in barometric pressure. Inasmuch as atmospheric pressure variations may cause smaller variations of temperature, I eliminate this disadvantage by use of the apparatus shown in Fig. 3. The tank 40 may contain vacuum and the steam may be discharged into the vacuum. The temperature at which boiling takes place is controlled by adjusting the pop-off valve 39 at the opening of the steam pipe. As atmospheric pressure does not act on valve 39, atmospheric changes can not influence the temperature. The valve is set for a given pressure of steam. Any customary means may be employed for maintaining the vacuum, and any other suitable type of valve may be used. I may employ an electrically controlled valve which is controlled from a pressure measuring device within the steam chamber; the exhaust pipe would then not need to open into a vacuum. A baffle 41 is provided in compartment 8 to prevent the direct inflow of vapor which might tend to vary the temperature of enclosure 14. The compartment 8 is hermetically sealed from compartment 10 by partition 9 which is secured at its periphery to brackets 3 through the gasket device 42. The motor 44 is mounted exteriorly of the cabinet structure 1 upon suitable bracket 45, and drive shaft 46, a rotating fan 47 thus stirring the air within compartment 10 to insure that all parts of the compartment 10 in which the supports of the oscillator are arranged will be at the same temperature. Inasmuch as the only separation between the upper and lower compartments is a thin metal plate 9 which allows heat to be transferred from the lower compartment to the upper, and as the heat insulation covering extends over the upper compartment, this upper compartment will naturally be maintained at a fairly constant temperature. For extreme control of temperature, however, a heater coil 48 is positioned below the fan 47 and controlled by the thermostat 49 in compartment 10. The thermostat is so regulated that it keeps the heater coil circuit closed until a predetermined temperature has been reached. This temperature is slightly higher than that normally assumed. Power supply for the apparatus is taken from the mains 51 which lead to the heater element 48 within compartment 10 and also to the heating elements 11 below the cabinet structure. The level of the fluid 7 within compartment 8 may be maintained through the fluid supply line 52.

As heretofore explained the fluid 7 is boiled continuously at predetermined pressure and under these conditions the latent heat of vaporization may be employed to maintain constant operating temperature around the frequency control element so that the oscillator functions at an extremely constant frequency due to the precise temperature conditions to which the frequency control element is subjected.

While I have described my invention in its preferred embodiments, I desire that it be understood that modifications may be made and that no limitations upon my invention are intended other than are imposed by the scope of the appended claims.

What I claim as new and desire to secure by Letters Patent of the United States is:

1. A frequency control apparatus comprising a cabinet structure divided into a pair of separate compartments, oscillator apparatus disposed in one compartment; a frequency fixing element disposed in the other compartment, said last mentioned compartment being partially filled with fluid and having means for effecting the continuous boiling thereof at constant pressure for subjecting said frequency fixing element to heat of vaporization.

2. In a frequency control apparatus, a heat insulated cabinet structure, means dividing said cabinet structure into separate compartments, an oscillator circuit disposed in one of said compartments, a frequency determining element disposed in another of said compartments, said last mentioned compartment containing a quantity of fluid, means for subjecting said fluid to heat for effecting a continued boiling thereof and subjecting said frequency determining element to a temperature controlled by latent heat of vaporization for controlling the operation of said frequency determining element at constant temperature.

3. A frequency control apparatus comprising a cabinet structure, means for dividing said cabinet structure into separate compartments, an oscillator apparatus disposed in one compartment, a frequency determining device disposed in the other compartment, a quantity of liquid in said last mentioned compartment, means for continuously supplying heat to said quantity of liquid for subjecting said liquid to a continuous boiling action at constant pressure for maintaining the temperature of said frequency determining element at the vaporizing temperature of said liquid at given pressure and separate means for independently controlling the temperature of the oscillator apparatus in said first mentioned compartment.

4. In a frequency control apparatus, a cabinet structure, a plurality of compartments in said cabinet structure, oscillator apparatus disposed in one of said compartments, and frequency fixing device disposed in the other of said compartments, means for maintaining the temperature of said frequency fixing device in accordance with the latent heat of vaporization of a liquid and separate means for maintaining the temperature of said oscillator apparatus constant.

5. A frequency control apparatus comprising a cabinet structure, a multiplicity of compartments therein, a frequency determining device in one of said compartments, an oscillator apparatus in another of said compartments, a quantity of fluid in the compartment which encloses said frequency determining element, means for subjecting said quantity of fluid to continuous boiling action for maintaining the temperature of said frequency determining element in accordance with the latent heat of vaporization of the liquid in said first mentioned compartment.

6. Frequency control apparatus comprising a heat insulated cabinet structure including a plurality of compartments, an oscillator apparatus disposed in one of said compartments, a frequency determining device connected therewith and positioned within another of said compartments, a quantity of fluid in said last mentioned compartment, means for subjecting said fluid to continuous boiling action at constant pressure for maintaining said frequency determining element at a temperature controlled by the latent heat of vaporization thereof and means for controlling the temperature of the oscillator apparatus in said first mentioned compartment.

7. In a frequency control apparatus, a heat insulated cabinet structure, a partition dividing said cabinet structure into separate compartments, oscillator apparatus arranged in one of said compartments, a frequency determining device disposed in the other of said compartments, means for circulating air at constant temperature through said first mentioned compartment for maintaining the temperature of the oscillator apparatus therein constant, and means in said second mentioned compartment for subjecting said frequency determining element to a temperature controlled by the latent heat of vaporization of a liquid therein.

8. In a frequency control apparatus, a heat insulated cabinet structure, a laterally extending plate member for dividing said cabinet structure into a pair of compartments, an oscillator apparatus located in one of said compartments, means for circulating air at constant temperature within said first mentioned compartment around the oscillator apparatus therein, a hermetically sealed casing suspended within the second of said compartments, a frequency determining element enclosed by said hermetically sealed casing and electrically connected with the oscillator apparatus in said first mentioned compartment and means in said second mentioned compartment for subjecting the hermetically sealed casing of said frequency determining element to a temperature controlled by the temperature of the latent heat of vaporization of a liquid in said second mentioned compartment.

9. In a frequency control apparatus, a heat insulated cabinet structure, a laterally extending partition dividing said cabinet structure into separate compartments, oscillator apparatus positioned in one of said compartments, a hermetically sealed casing suspended from said partition into the second compartment, a frequency determining element enclosed by said hermetically sealed casing and electrically connected with the oscillator apparatus in said first mentioned compartment, a quantity of liquid in said second mentioned compartment and means for subjecting said liquid to a continuous boiling action at constant pressure for maintaining said frequency determining element at a temperature controlled by the latent heat of vaporization of the liquid in said second mentioned compartment.

10. Frequency control apparatus comprising a heat insulated cabinet structure, a quantity of liquid therein, means for subjecting the liquid to continuous boiling action, a hermetically sealed casing suspended above said quantity of liquid, a frequency determining element in said hermetically sealed casing, an exterior pipe connection between the upper and lower portions of said cabinet structure, a baffle plate suspended within said cabinet structure for preventing the direct discharge of vapor into said cabinet structure while permitting the circulation thereof through said cabinet structure at constant pressure for selectively fixing the temperature of said frequency determining element in accordance with the latent heat of vaporization of the liquid in said cabinet structure.

ERNEST R. HENTSCHEL.